United States Patent [19]

Sauber

[11] Patent Number: 5,282,605
[45] Date of Patent: Feb. 1, 1994

[54] ROTATABLE TRAILER JACK MECHANISM

[76] Inventor: Charles J. Sauber, 10 N. Sauber Rd., Virgil, Ill. 60182

[21] Appl. No.: 4,290

[22] Filed: Jan. 14, 1993

[51] Int. Cl.$^5$ ............................................. B60S 9/02
[52] U.S. Cl. ................................... 254/420; 254/424
[58] Field of Search ............. 254/420, 424, 425, 418; 403/376, 355, 324; 74/527; 248/289.1

[56] References Cited

U.S. PATENT DOCUMENTS

| | | | |
|---|---|---|---|
| 737,603 | 9/1903 | Fritz | 403/376 |
| 2,734,726 | 2/1956 | Gebhart | 254/424 |
| 2,841,452 | 7/1958 | Borgman et al. | 403/376 |
| 3,438,664 | 4/1969 | Meyer | 403/376 |
| 3,841,663 | 10/1974 | Proffit | 254/420 |
| 3,863,894 | 2/1975 | Mansi et al. | 254/420 |
| 5,011,119 | 4/1991 | Harrington | 254/420 |
| 5,067,692 | 11/1991 | Nudd et al. | 254/420 |

Primary Examiner—Robert C. Watson
Attorney, Agent, or Firm—Leydig, Voit & Mayer, Ltd.

[57] ABSTRACT

A trailer jack mounting assembly which is rotatable has an outer support member which has a cylindrical bore and is mounted to a trailer frame adjacent to its hitch end with the outer support member receiving a horizontally disposed rectangular cross-section sleeve member rotatably fitted and restrained within the outer support member. A slidable latch member in the form of a U-shaped plate having a handle portion at its top fits within a track in the outer support member and is movable between open and closed positions whereby the rotation of the inner support carrying the jack can be placed in either an upright position or a horizontal position.

3 Claims, 6 Drawing Sheets

1

ROTATABLE TRAILER JACK MECHANISM

FIELD OF THE INVENTION

The present invention relates generally to trailer jacks for resting and raising the hitch end of a trailer and, more particularly, to a trailer jack which may be placed in a storing position during trailer use.

BACKGROUND OF THE INVENTION

Various types of trailer mechanisms for resting the hitch end of a trailer to permit uncoupling of the trailer and to store the trailer in a normal horizontal position have been previously used in the art. Such trailer jacks are typically permanently mounted vertically to a support member of the trailer frame near the hitch end. Trailer jacks typically have a crank handle which is rotated to raise and lower either a ground plate or a caster which contacts the ground thereby providing an adjustable rest for the trailer. To allow for sufficient mechanical advantage to lift the hitch end of a heavy trailer many revolutions of the handle are required to raise the rest end away from the ground into a position for transport. Raising the jack thus becomes a very slow and tedious job. Furthermore, due to the low mounting location of the jack and due to a limited amount of travel for the jack, the rest end of the jack cannot be raised sufficiently to avoid having the end impact with the ground when traveling on rough terrain. In an attempt to sufficiently raise the end during transport a long jack travel is required making the jack mechanism expensive and subject to wear and breakage.

One attempted solution to somewhat reduce the time required to raise the jack and to reduce the likelihood of damage to the jack during travel over rough terrain was the provision of a hinged caster. The arrangement, however, was down below and cumbersome to operate. Moreover, the gain of clearance height was limited to the height of the caster.

The present invention is directed toward overcoming one or more of the problems discussed above by providing a rotatable support arrangement for the trailer jack which is easy to use, minimizes the time and effort to raise the jack rest end for transport and reduces the likelihood of damage to the rest end during transport.

Other objects and advantages of the invention will be apparent from the following detailed description.

SUMMARY OF THE INVENTION

In accomplishing these and other objects of the invention, there is provided a rotatable and repositionable trailer jack for supporting a hitching end of a trailer. The jack is connected to the trailer frame by a horizontally disposed outer support member which has a cylindrical bore which in turn receives a horizontally disposed sleeve member rotatably fitted and axially restrained within the support member. A slidable latch member is provided for selectively preventing the rotation of the sleeve within the bore. The jack is fixedly attached centrally to the outer end of the sleeve whereby the rotation of the sleeve within the bore defines a first jack upright position and second jack tilted position. The latch member is used to maintain both of the jack positions. In a preferred embodiment of this aspect of the invention, the latch member is a slidable U-shaped plate having a handle portion at its top and which fits between the tubular outer member and the inner sleeve that has a rectangular cross section.

DESCRIPTION OF THE PREFERRED EMBODIMENT

While the invention will be described in connection with a particular preferred embodiment, it will be understood that it is not intended to limit the invention to that particular embodiment. On the contrary, it is intended to cover all alternatives, modifications and equivalents as may be included within the spirit and scope of the invention as defined by the appended claims.

Figure 1:
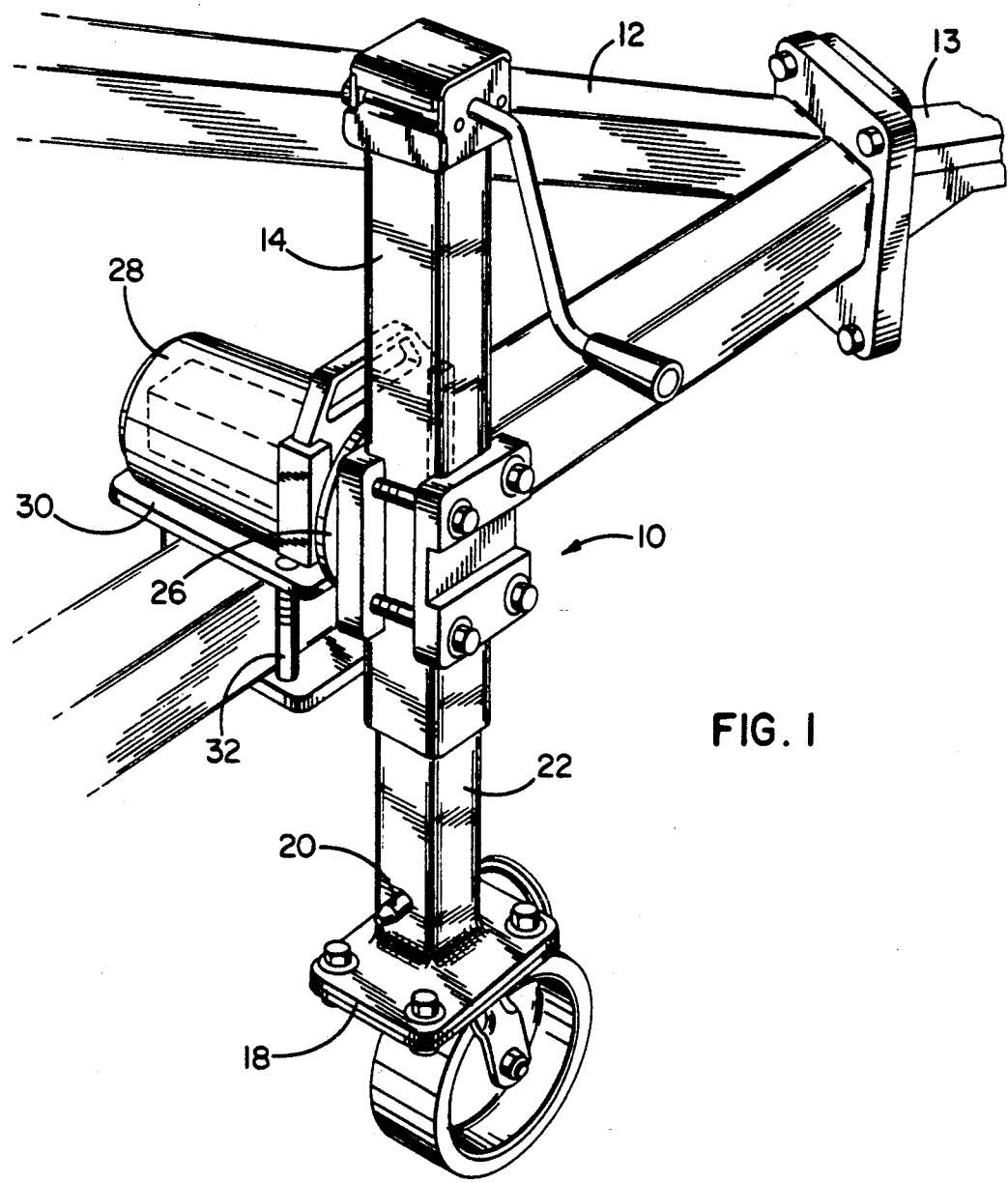
FIG. 1 is a perspective of a rotatable jack support mechanism embodying the present invention as installed on a trailer.
Figure 2:
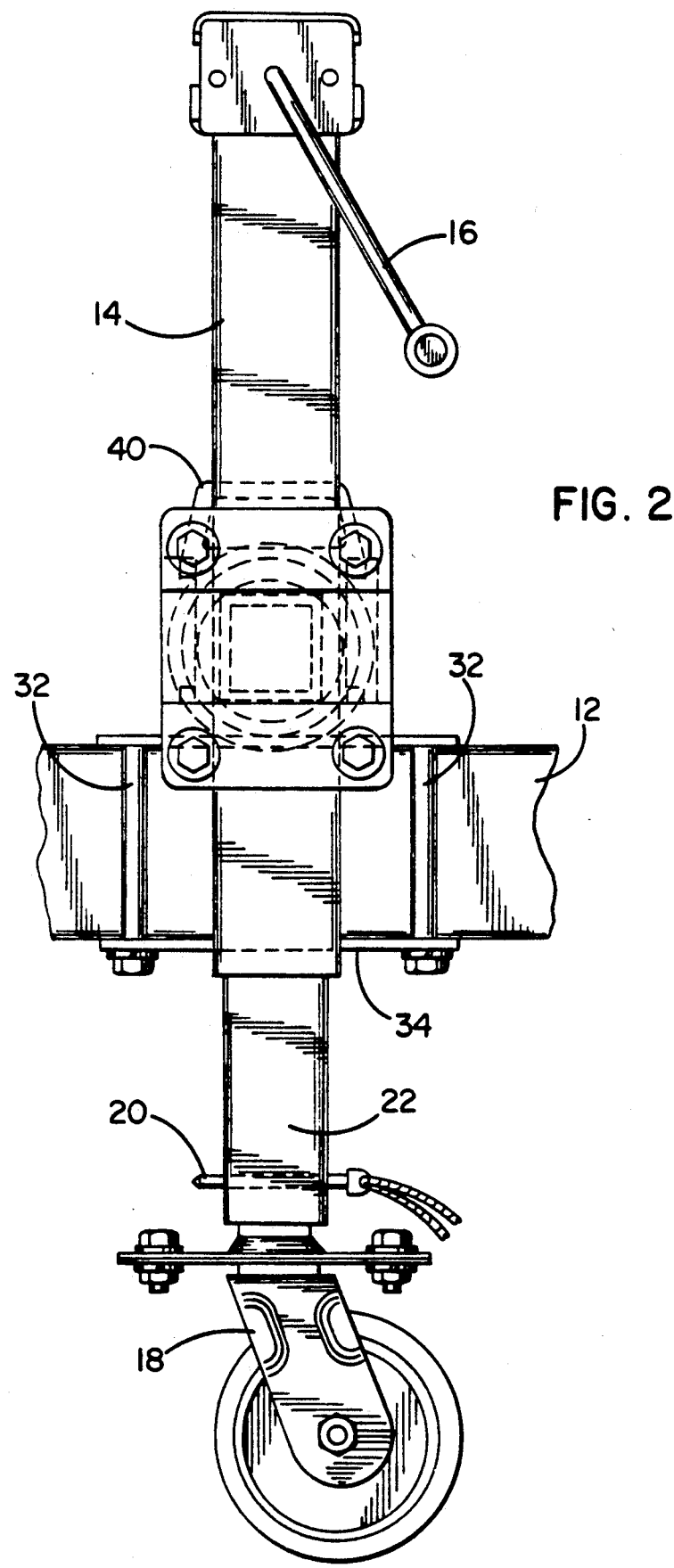
FIG. 2 is a side elevational view of a trailer jack in the upright position.
Figure 3:
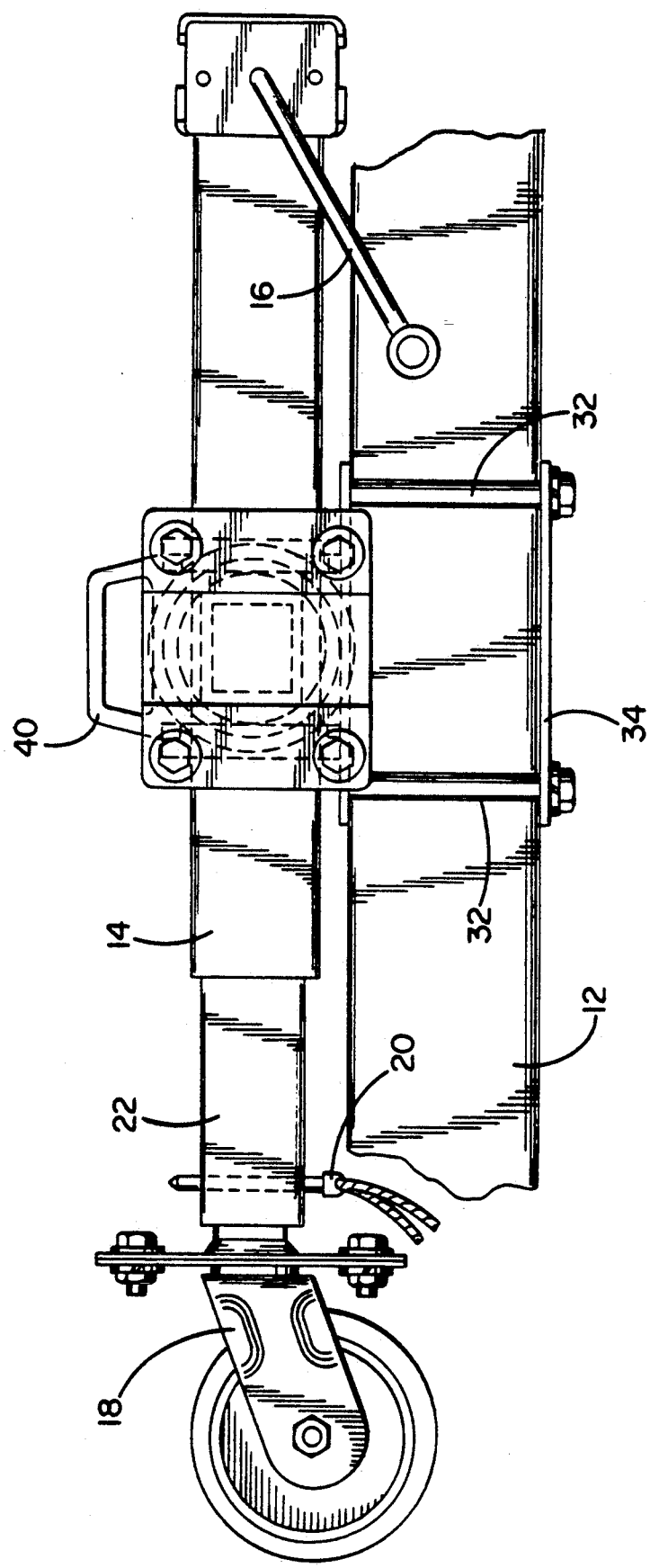
FIG. 3 is a side elevational view of a trailer jack in the horizontal position.

Now turning to the drawings, in referring to FIG. 1, there is shown a trailer jack mechanism, generally indicated at 10 which is mounted to a trailer frame 12 close to the hitch band 13. The trailer jack itself is a conventionally utilized type having a tubular column 14 with a rotatable handle 16 at its upper end and a caster 18 at its lower end. The caster 18 is held in place by a removable pin 20. It will be appreciated, however, that in place of the caster 18 a conventional foot rest or flat plate (not shown) may be utilized. The jack internal mechanism (not shown) involves a gear drive driven by the handle 16 that rotates a screw which co-acts with a nut member carried by an internal column 22 to raise and lower the caster end of the jack.

Figure 4:
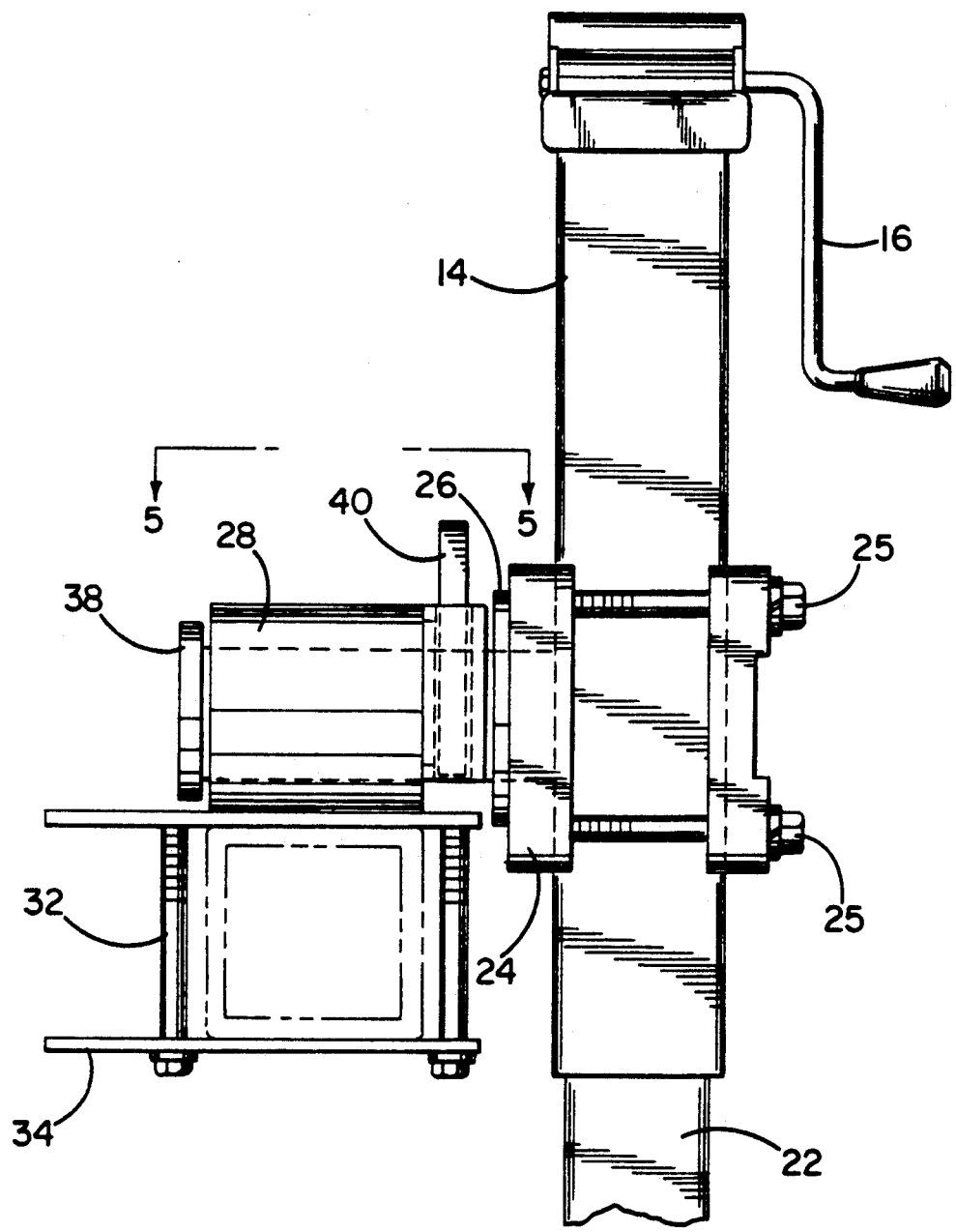
FIG. 4 is a partial side elevational view of a trailer jack in the upright position.

Referring to FIG. 4, the trailer jack outer support column 14 is held by clamping brackets 24 and bolts 25 to an outer retaining member 26 attached to an innter support member that is received within a tubular outer support member 28. The outer support member 28 which is in the form of a tube has a mounting bracket 30 affixed thereto which is here shown as adapted to receive bolts 32 that in conjunction with a second bracket 34 clamp the outer support to the trailer frame 12. Although the mounting is here shown in the form of a bolted bracket arrangement, the outer support member can be welded to the trailer frame for a permanent fix.

Figure 5:
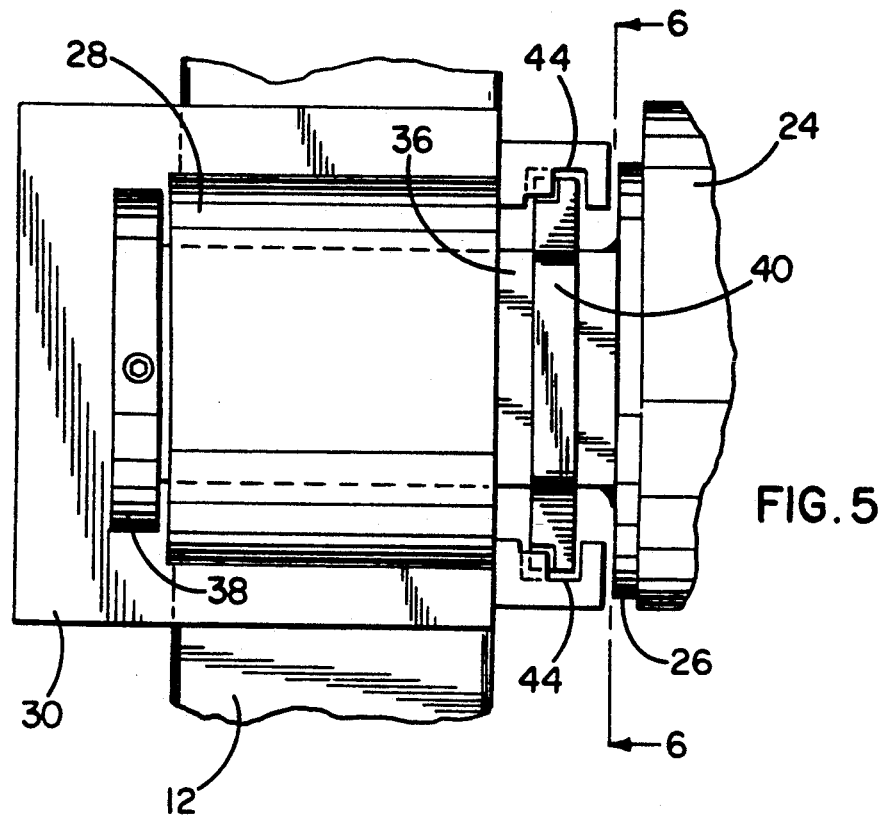
FIG. 5 is a sectional plan view taken along line 5—5 of FIG. 4.
Figure 6:
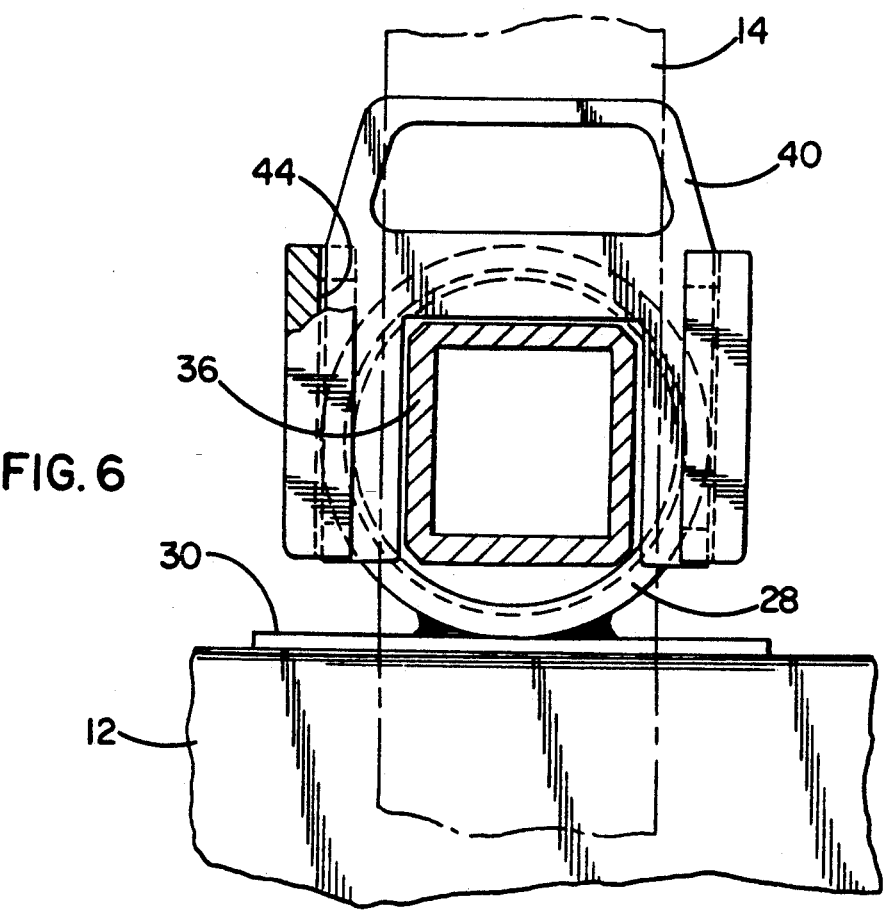
FIG. 6 is a sectional plan view of the invention taken along line 6—6 of FIG. 5.

As viewed in FIGS. 5 and 6, conjointly, the inner support member in the form of a rectangular sleeve 36 is disposed axially within the central bore of the outer support member 28 and a inner retaining collar 38 maintains the inner sleeve member 36 from axially moving. The outer retaining flange 26 which is mounted to the jack supporting bracket 24 is fixed at the outer end of sleeve 36, the arrangement being such that sleeve 36 which is preferably square in shape can rotate within the outer support member 28.

In accordance with the present invention, provision is made in the form of a slidable latch member 40 which includes a substantially U-shaped lower end having a rectangular opening 42 that is slidable within a track 44 provided in the outer support member 28 that receives the latching member 40. The latching member 40 has a handle portion 46 at its upper end and side grooves 46 cooperate with nibs 48 on the track to define the limits of movement of the latching member 40.

Figure 7:
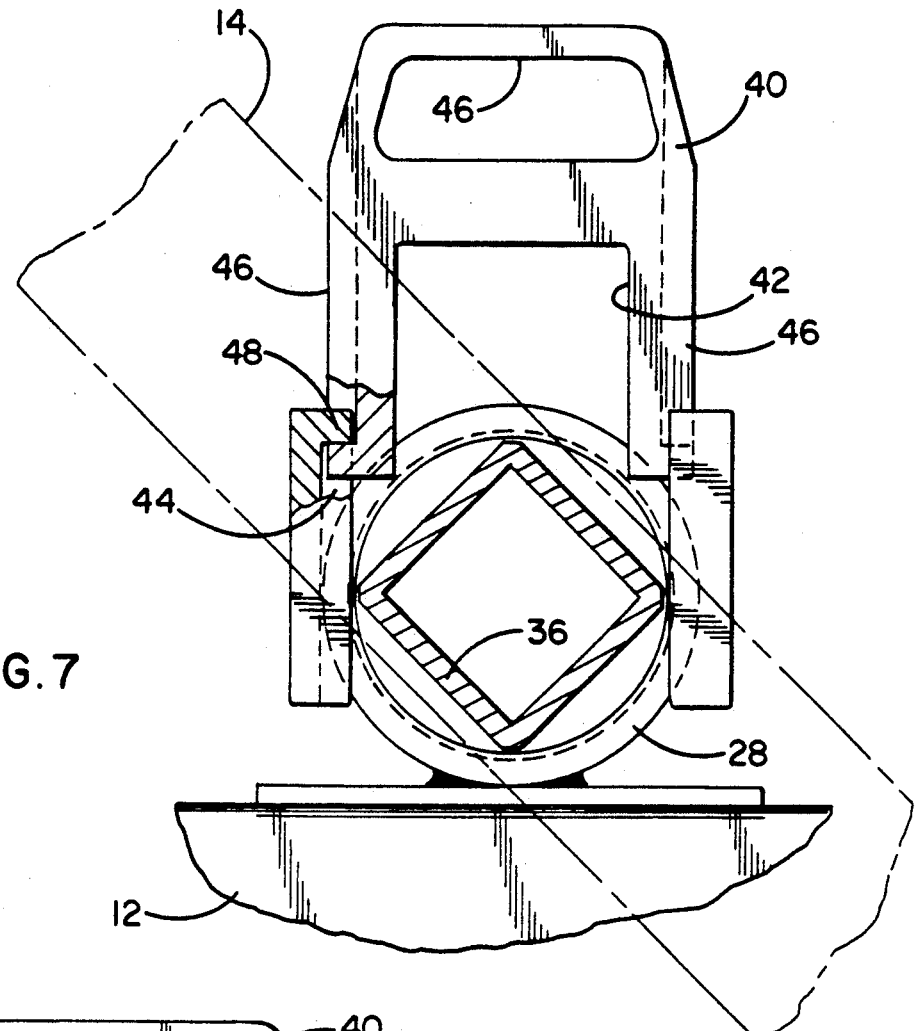
FIG. 7 is a sectional plan view similar to FIG. 6 here showing the latch member raised and the pivoting of the jack assembly.
Figure 8:
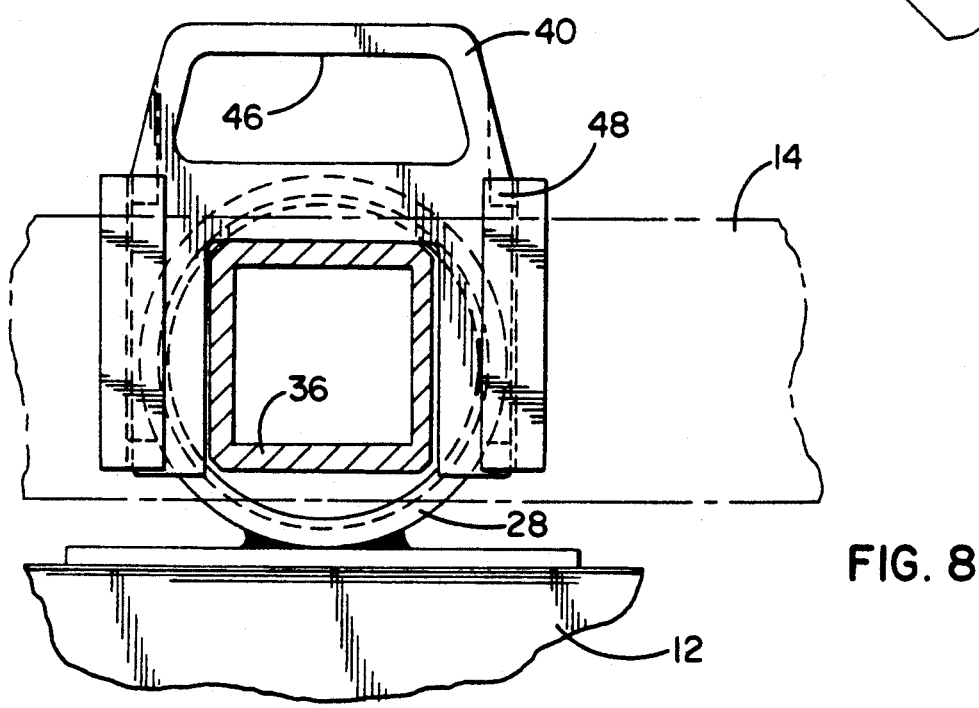
FIG. 8 is a sectional plan view similar to FIG. 6 here showing the jack assembly in a horizontal position.

As seen in FIG. 7 lifting of the latching member 40 by the handle 46 allows the inner sleeve 36 carrying the jack to be rotated within the outer member 28. When the jack is moved from the vertical position to the horizontal position as shown in FIG. 8, the latching member can be moved back into place pushing it downwardly where the jack is then held firmly in the horizontal position. Reversing the procedure of lifting the handle to a position such as in FIG. 7 allows the jack to be rotated back to the vertical such as shown in FIG. 6 where again the handle 40 can be pushed downwardly to latch the inner sleeve 36 in this vertical position.

I claim:

1. A support for a trailer jack mountable to a trailer frame adjacent to its hitch end comprising:
   outer support means attached to the trailer frame;
   inner rotatable support means rotatably received and axially restrained within said outer support means;
   jack means fixedly attached to said inner rotatable support means; and latching means disposed between said inner and outer support means; said latch means being movable between open and closed positions whereby the rotation of said inner support means defines a first jack upright position and a second jack tilted position, said outer support means comprise tubular means having a central bore attached to the trailer frame, said inner support means comprises rectangular sleeve means attached to said jack means and rotatable within said tubular means central bore, said latching means comprises a slidable U-shaped member movably disposed between said inner and said outer support means, and said slidable U-shaped member is captively mounted.

2. The trailer jack and support of claim 1 wherein said rectangular sleeve means is square.

3. The trailer jack support of claim 1 wherein said slidable U-shaped member includes handle means at the top portion thereof.

* * * * *